June 3, 1930.  I. A. WEAVER  1,761,163
KING PIN TESTING APPLIANCE
Filed July 13, 1929   4 Sheets-Sheet 2
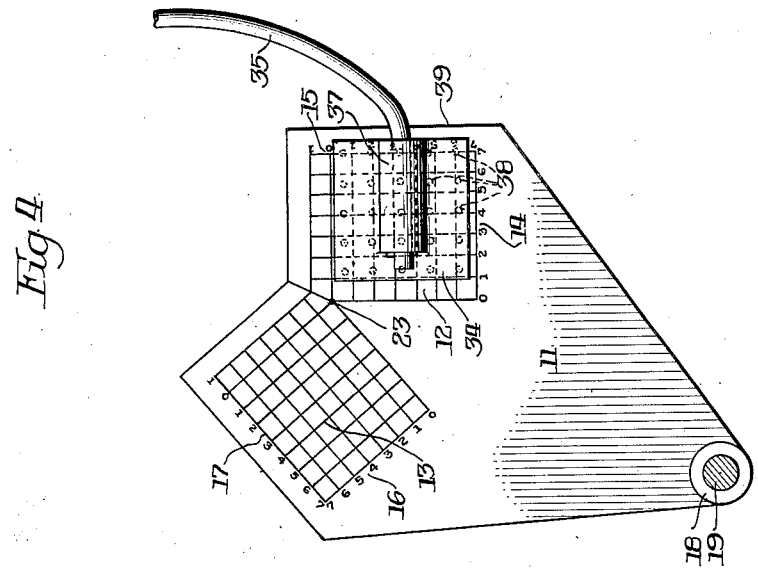
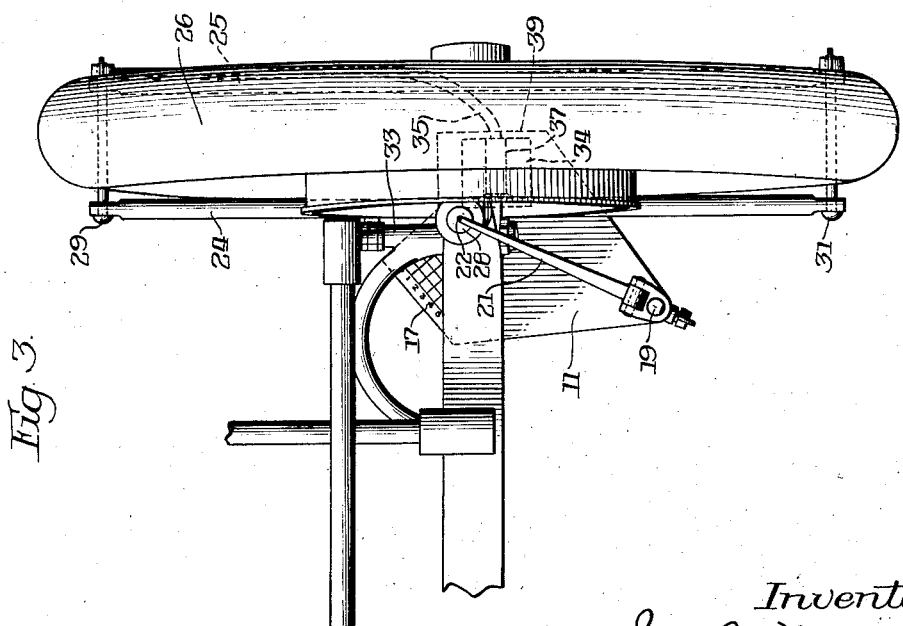
Inventor:
Ira A. Weaver
By Walter M. Fuller
Atty.

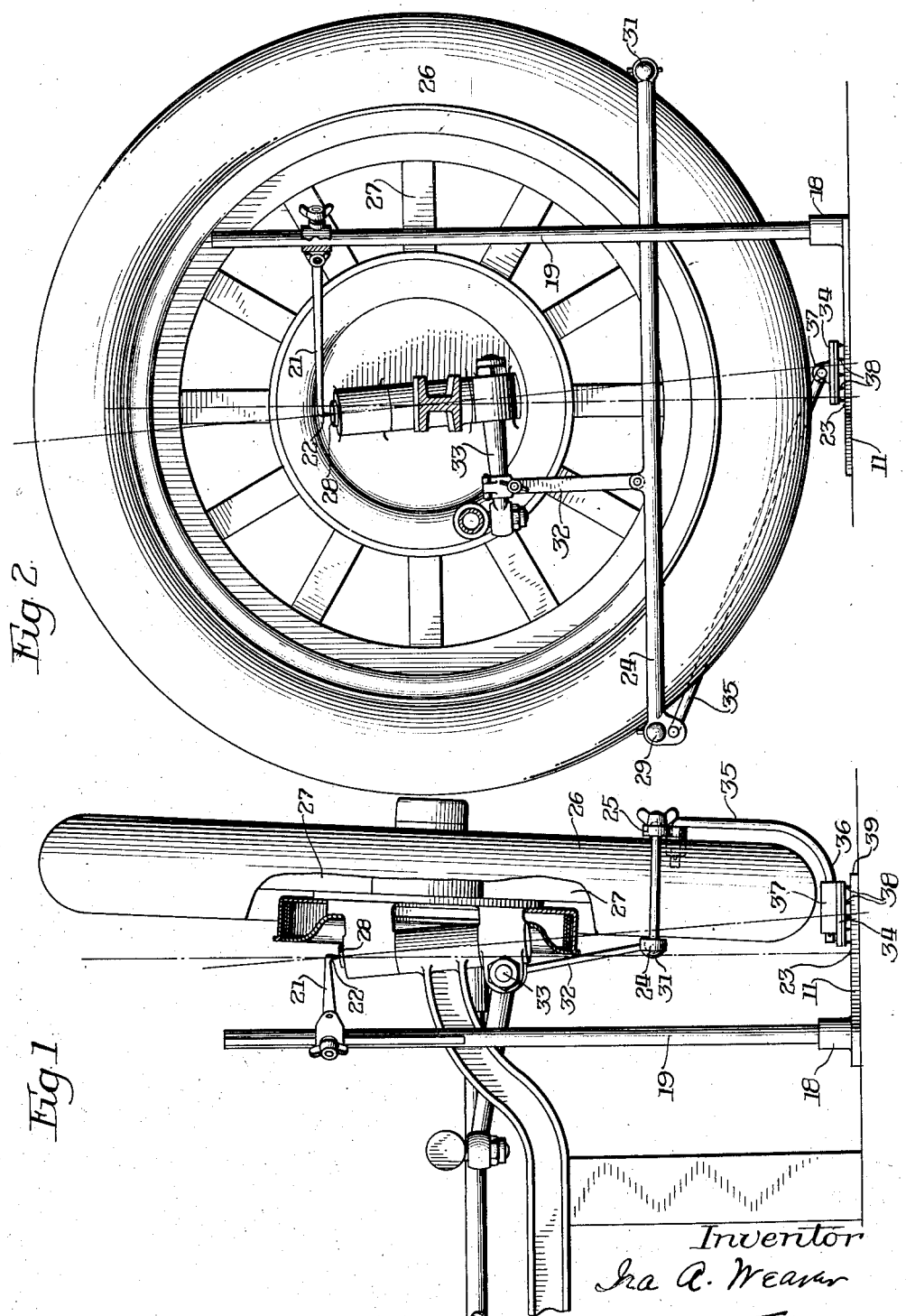

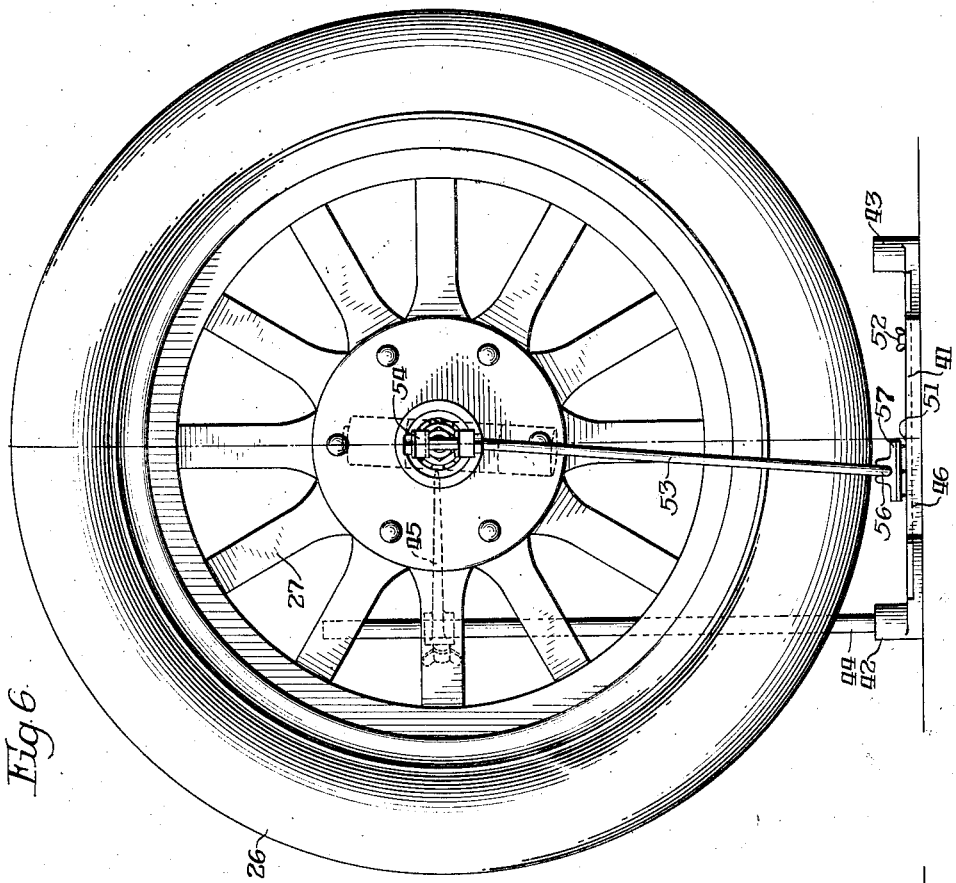
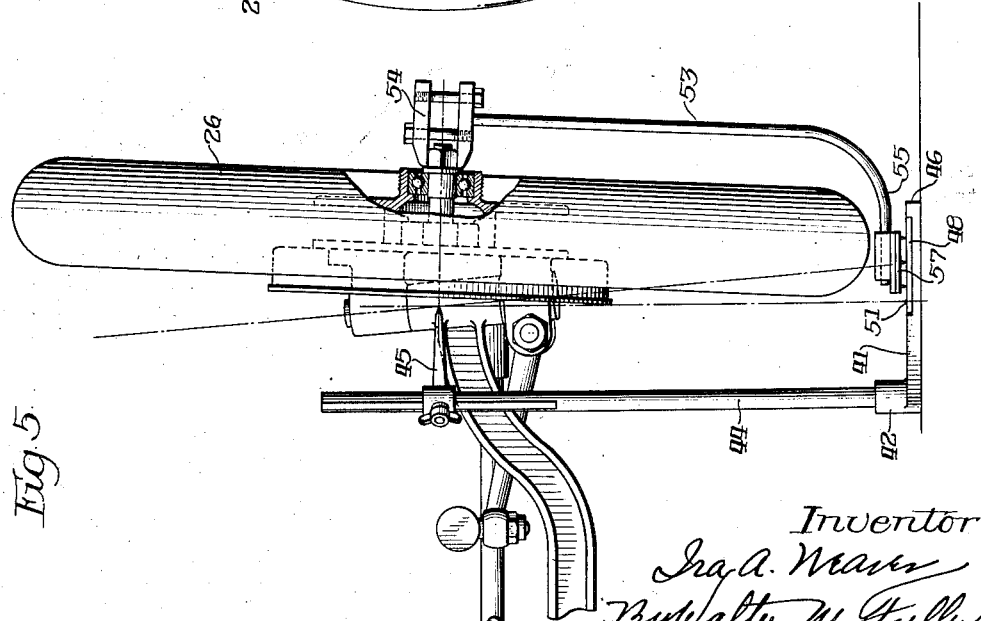

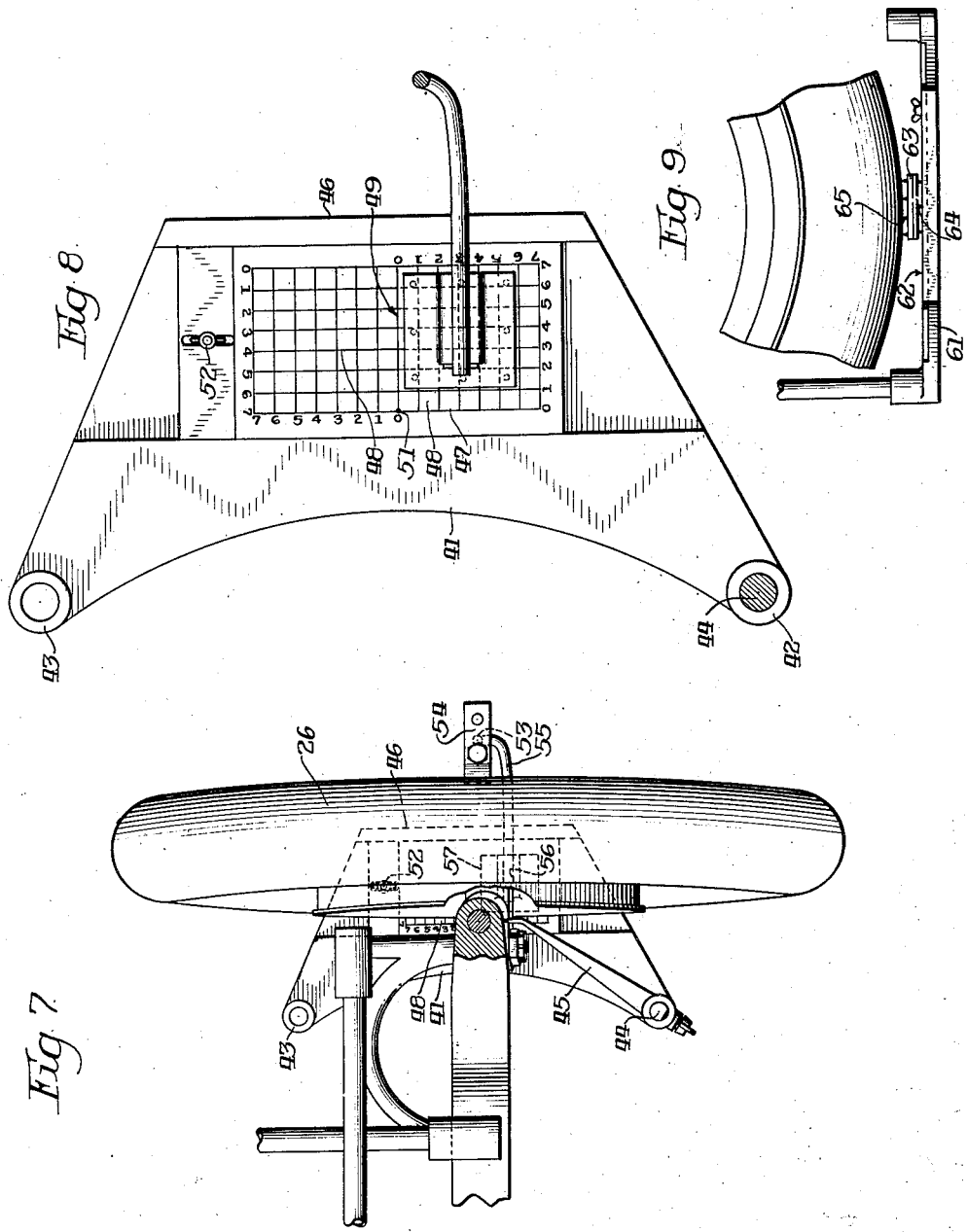

Patented June 3, 1930

1,761,163

UNITED STATES PATENT OFFICE

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS

KING-PIN TESTING APPLIANCE

Application filed July 13, 1929. Serial No. 378,008.

My present invention aims to supply simple, reliable and efficient means for testing or determining the angular position or inclination or camber and castor of the king-pins of the front-wheels of vehicles, such as those of automobiles.

In order that those acquainted with this art may fully understand the invention and its structural and functional advantages, in the accompanying drawings, forming a part of this specification and to which reference should be had, present desirable embodiments of the invention have been illustrated in detail, and, for the sake of clearness and simplicity, the same reference numerals have been employed throughout the several views to designate the same or like parts.

In these drawings:

Figure 1 is an end view of one species of the instrument applied to a vehicle-wheel and its king-pin, a few of the parts being shown in section;

Figure 2 is a vertical section through the axle of the vehicle looking outwardly toward the king-pin and wheel;

Figure 3 is a plan view of the structures depicted in Figures 1 and 2;

Figure 4 is a plan view of the chart and its associated multiple marker;

Figures 5, 6, 7 and 8 are views similar to those of Figures 1 and 4 inclusive of a modified form of device; and Figure 9 is a fragmentary elevation of a third style of structure.

Referring first to the species portrayed in Figures 1 to 4 inclusive, it will be observed that a floor-plate 11 of the shape shown in Figure 4 is laid off with two sets 12 and 13 of cross-section lines arranged at an angle to one another as shown, the lines of each group being positioned at right angles to one another and corresponding to degrees, being accordingly consecutively numbered as at 14, 15 and 16, 17.

Such plate has an upright socket 18 constituting a support for a vertical post or standard 19 carrying a vertically-adjustable pointer 21, the downturned end or index 22 of which is located exactly above the intersection 23 of all four zero lines of the plate 11, one edge of the latter being intended to be parallel with the outside of the automobile, which locates the standard 19 at a position between the wheel and the frame or chassis of the car, the object of the two sets of graduations on the plate being to adapt the latter to be used in the position specified either at the right hand or left hand side of the vehicle without disturbing the fixed relation of the standard and the pointer to the lines on the plate.

Two, parallel, horizontal bars 24 and 25 bear against opposite sides of the tire 26 of the wheel 27 whose king-bolt 28 is being tested, such companion bars being clamped to the tire by a pair of bolts 29 and 31 with wing-nuts at the opposite ends of the bars beyond the periphery of the tire, such inner bar 24 having a link connection 32 with the wheel steering arm 33.

An end of the outer bar 25 is joined to a marking pad 34 positioned over plate 11 by a curved link 35, the lower, inturned end 36 of which is accommodated in a bearing 37 on and extended directly across the top of the pad, the under face of the latter having a plurality of downwardly-projecting, equally-spaced markers 38, preferably, but not necessarily, composed of small points or projections of rubber or similar resilient material.

The operation of the appliance is substantially as follows:

The car is elevated until the wheel is approximately an inch or so from the floor, the plate 11 is positioned on the floor as specified with its edge 39 parallel to the longitudinal axis of the car and with the end of the pointer exactly over the center of the upper end of the king-bolt.

The parallel bars are clamped to the wheel in the manner stated and connected to the steering arm as designated, which arrangement and connection of elements prevents the wheel from rotating on its spindle.

Chalk, or other appropriate marking material, is applied to the rubber points of the pad and the latter is allowed to rest on the chart on the floor-plate.

Then the wheel is oscillated around the king-pin with the result that the numerous marking-pad points trace short arcs of circles on the corresponding chart on the floor-plate, that point, if any, exactly below the center line of the king-pin making merely a point on the chart and all of the other points describing and tracing small concentric arcs of different lengths, those nearest the king-pin center being shortest and those at a more remote position being longest.

Stated a little differently, the projections on the pad will draw arcs on the chart of varying lengths all around a common center and the latter can be easily located with relation to the graduated lines.

Knowing the height of the pointer above the floor-plate and determining the position of such center on the chart with relation to the zero line by use of one set of graduated lines, the forward and back tilt or castor of the king-pin can be readily ascertained, and by observing the position of such center with respect to the other zero line, the crosswise tilt or camber can be quickly determined.

To ascertain the condition of the king-pin at the other side of the car, a similar procedure is followed, except that the other chart of the floor-plate is used.

Now referring to the species presented in Figures 5 to 8 inclusive, it may be noted that this appliance is for use in those instances where it is difficult to locate the center of the upper end of the king-pin due to the obstructing presence of brake-mechanism associated with the front-wheel.

In this case, the floor-plate 41 has two sockets 42 and 43 at its opposite ends, so that the standard 44 may be used in either one, thus adapting the apparatus for employment with either right hand or left hand front wheels.

With this instrument, the vertically-adjustable pointer 45 is positioned so that its index end is at the center of the forward side of the king-pin and on a line where the axis of the wheel axle intersects the axis of the pin.

The edge 46 of the floor-plate is set parallel with the car, and, since the end of the pointer is located directly above the zero line 47 of the duplex chart 48, it is certain that such line is exactly beneath the intersection of the axes of the king-pin and wheel-spindle.

Then by suspending a plumb-bob (not shown) temporarily from the center of the end of the wheel-spindle and moving the chart lengthwise the floor-plate until the cross zero line 49 registers with it, we will be certain that the zero 51 is exactly beneath the specified axes intersection.

In this structure, the chart is made movable longitudinally of the floor-plate and may be held in adjusted position thereon by the slot and thumb-screw connection 52 between them, thus permitting the stated shifting of the chart without movement of the plate on which it is mounted.

A bent arm 53 is secured by any approved clamp 54 to the end of the wheel-spindle and its inturned, horizontal end 55 occupies a vertical slot 56 in the top of the marking-pad 57 which otherwise is like that already described, whereby the pressure of the pad on the chart is merely that of its own weight and there is no substantial tendency during the movement of the pad to shift the position of the plate.

Having thus properly assembled the parts of the mechanism, it is operated substantially as in the previously-stated instance.

It is possible to simplify the structure considerably, in that a floor-plate and its chart and a marking-pad are all that are essential, knowing the height of the top end of the king-bolt which, of course, can be readily ascertained.

Such an appliance is shown in Figure 9 and it comprises any suitable form of base-plate 61 carrying a graduated chart 62.

The marking-pad 63 has resilient, tracing points or projections 64 on its under surface, as in the other instances, and its top surface is equipped with a plurality of sharp points or prongs 65 designed to be sufficiently embedded directly in the surface of the rubber tire 66 to move with the wheel and by such travel to trace or mark the curves hereinbefore mentioned.

With the plate properly positioned and knowing the height of the upper end of the king-bolt, the center designated by the curves or arcs traced on the chart will give adequate data to show the degree of tilt of the bolt both longitudinally and transversely of the vehicle.

It is to be understood, of course, that the prongs which press into the tire are sufficiently short as to cause no injury to the tire, and that the pressure of the pad on the chart is not enough to dislocate or displace the latter.

The floor-plate and its chart may be like that shown in Figures 1 to 8 inclusive and may be correctly and accurately positioned with relation to the king-bolt in the manner specified in connection with the description of the embodiment of the invention illustrated in such figures.

In all instances, the pad marks short, curved lines which define a point on the chart on an extension of the inclined axis of the king-pin, then by verifying the distance of such point or center from a zero point directly below the center of the upper end or other definite point on the axis of the pin, and knowing the height of the latter axis center or point above the chart, the degree of pin tilt is easily established.

Under some circumstances, a single marking point may be sufficient so long as this enables the operator to define and locate the center on the chart which he is seeking.

Those acquainted with this art will readily understand that the invention, as defined by the appended claims, is not limited and restricted to the particular species illustrated and described and that many minor mechanical changes may be incorporated in the structures set forth without departure from the heart and essence of the invention and without the loss or sacrifice of any of its material benefits and advantages.

I claim:

1. In a vehicle-wheel king-pin testing appliance, the combination of marking means and means to cause said marking means to turn with the wheel around the axis of the king-pin, whereby the prolongation of said axis may be determined by the marking effected by said marking means.

2. In a vehicle-wheel king-pin testing appliance, the combination of a graduated chart, marking means cooperating with said chart, and means to cause said marking means to turn with the wheel around the axis of the king-pin, whereby the intersection of a prolongation of said axis with said chart may be determined by the marking effected by said marking means on said chart.

3. In a vehicle-wheel king-pin testing appliance, the combination of a chart adapted to rest on the floor, means to verify the position of said chart with relation to the king-pin, marking means cooperating with said chart, and means to cause said marking means to turn with the wheel around the axis of the king-pin, whereby the intersection of a prolongation of said axis with said chart may be determined by the marking effected by said marking means on said chart.

4. In a vehicle-wheel king-pin testing appliance, the combination of a chart adapted to rest on the floor and provided with intersecting graduation lines, means to verify the relation of a definite point of said chart with a predetermined point of the axis of the king-pin, marking means cooperating with said chart, and means to cause said marking means to turn with the wheel around the axis of the king-pin, whereby the intersection of a prolongation of said axis with said chart may be determined by the marking effected by said marking means on said chart.

5. In a vehicle-wheel king-pin testing appliance, the combination of a chart designed to rest on the floor and provided with two groups of intersecting graduation lines adapting the chart for use with the king-pin at either side of an automobile, means to verify the relation of a definite point of said chart with a predetermined point of the axis of the king-pin, marking means cooperating with said chart, and means to cause said marking means to turn with the wheel around the axis of the king-pin, whereby the intersection of a prolongation of said axis with said chart may be determined by the marking effected by said marking means on said chart.

6. In a vehicle-wheel king-pin testing appliance, the combination of a floor-plate, a graduated chart on said floor-plate, a pointer supported on said floor-plate in a precise relation to said chart and adapted by cooperation with a predetermined point in the axis of the king-pin to assist in correctly positioning the chart with relation to the king-pin, marking means cooperating with said chart, and means to cause said marking means to turn with the wheel around the axis of the king-pin, whereby the intersection of a prolongation of said axis with said chart may be determined by the marking effected by said marking means on said chart.

7. In a vehicle-wheel king-pin testing appliance, the combination of a chart adapted to be positioned on the floor in a definite relation to the king-pin, marking means cooperating with said chart, means to prevent the corresponding vehicle-wheel from turning on its spindle, and means to cause said marking means to turn with the wheel around the axis of the king-pin, whereby the intersection of a prolongation of said axis with said chart may be determined by the marking effected by said marking means on said chart.

8. In a vehicle-wheel king-pin testing appliance, the combination of a chart adapted to be positioned on the floor in a definite relation to the king-pin, means having a plurality of spaced marking points cooperating with said chart, and means to cause said marking means to turn with the wheel around the axis of the king-pin, whereby the intersection of a prolongation of said axis with said chart may be determined by the plurality of marks effected by said marking means on said chart.

In witness whereof I have hereunto set my hand.

IRA A. WEAVER.